Patented Nov. 12, 1940

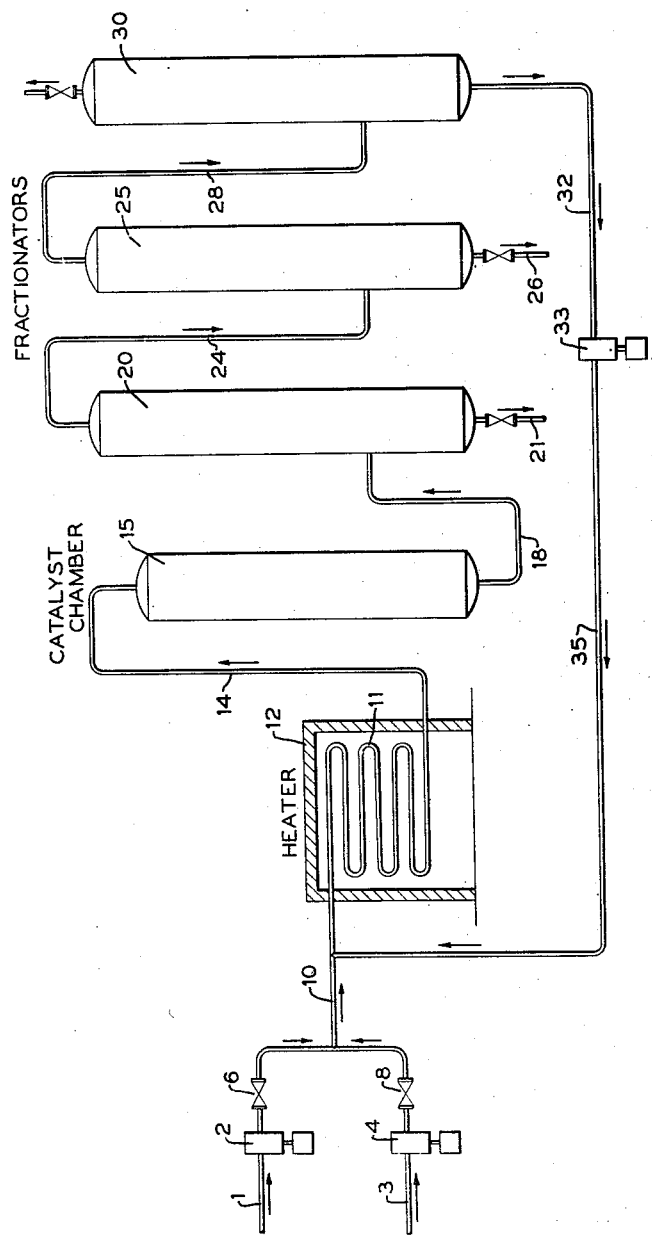

2,221,165

UNITED STATES PATENT OFFICE 2,221,165

CONVERSION OF LOWER MOLECULAR WEIGHT HYDROCARBONS INTO HIGHER MOLECULAR WEIGHT HYDROCARBONS

Arthur R. Goldsby, Port Arthur, Tex., assignor to The Texas Company, New York, N. Y., a corporation of Delaware Application October 15, 1937, Serial No. 169,134

13 Claims. (Cl. 196—10)

This invention relates to the conversion of lower molecular weight hydrocarbons into higher molecular weight hydrocarbons and has to do particularly with the production of higher molecular weight liquid hydrocarbons from lower molecular weight paraffinic hydrocarbons under the influence of temperature and a suitable catalyst.

It has been known heretofore that paraffin hydrocarbons may be alkylated with olefin hydrocarbons. It has now been found that paraffins may be alkylated with paraffins by a suitable catalyst and at proper temperatures. The present invention provides for the conversion of paraffinic hydrocarbons whereby two paraffins of like or different composition interact or alkylate to produce a higher molecular weight product containing a large proportion of branch chain paraffins.

In accordance with the present invention, paraffinic hydrocarbons are subjected to sufficient temperatures, to obtain the desired reactions, in the presence of a catalyst or mixture of catalysts which are capable of dehydrogenation and alkylation. The dehydrogenation function is intended to produce olefins and the alkylation function is intended to effect alkylation of readily alkylated materials, such as certain paraffins, by the olefins which are present. Such a combination of reactions takes place satisfactorily when suitable catalysts are selected and composition of the hydrocarbons is such that there is present a paraffin which is readily alkylated in the presence of the olefins resulting from the dehydrogenation reaction. We have found that such a condition obtains particularly when the hydrocarbon mixture treated is composed of substantial amounts of straight chain and branch chain paraffins.

The reactions involved are complex and not fully understood and accordingly the invention is not predicated on any particular theory of reaction. In order to explain the invention more clearly, however, certain reactions, which are believed to take place, may be mentioned. For example, when reacting butane with isobutane a product containing a large proportion of iso-octane is obtained and may result from one or more reactions including dehydrogenation of isobutane to isobutene; polymerization of isobutene to di-isobutylene; alkylation of isobutene with isobutane, to form iso-octane; hydrogenation of di-isobutene to iso-octane with hydrogen resulting from the dehydrogenation of butane or isobutane; alkylation of isobutane with di-isobutene to form iso-octane; dehydrogenation of butane to butene; alkylation of isobutane with butene to form iso-octane. The above series of reactions is not intended to be complete, inasmuch as other reactions may take place simultaneously or a continuation of the same type of reactions may occur to produce correspondingly higher polymers. The above reactions are particularly useful in the manufacture of motor fuel, although by letting the reaction continue, or using more suitable charging stocks, it is possible to obtain liquid hydrocarbons of higher molecular weight than motor fuel, such as gas oils and lubricating oils.

The catalyst should be one having dehydrogenation and alkylation properties. Generally, a mixture of catalyst is preferred; one having properties which function primarily for dehydrogenation and the other having properties which function mainly for alkylation. I have found a good catalyst meeting the above requisites to be a mixture of chromic oxide or chromic oxide mounted on activated alumina and a metallic halide. We prefer a chromic oxide gel, such as disclosed in U. S. Patent 1,905,383, Frey et al., April 25, 1933. This material is an active dehydrogenation catalyst. As a metallic halide we may use aluminum chloride, aluminum bromide and other anhydrous metallic halides such as chlorides of iron, zinc, boron, etc. These materials are active polymerization and alkylation catalysts. I prefer to use aluminum chloride or aluminum bromide. A mixture of chromic oxide gel and aluminum chloride is satisfactory. Proportions of the dehydrogenation and alkylation catalysts may vary within wide ranges. In general, from 20–80% of a dehydrogenation catalyst and 80–20% of an alkylation catalyst is satisfactory. I prefer, ordinarily to use a mixture containing about 50% of each.

The reaction usually takes place at elevated temperature and accordingly the reaction is ordinarily carried out in the vapor phase. However, liquid phase reaction may be used if sufficiently high pressures are employed or high boiling point charging stocks are used. I have found temperatures in the range of about 450–1100° F. and preferably about 600–1050° F. a useful working range. Pressures are ordinarily low and may vary from atmospheric to considerable superatmospheric pressure. Ordinarily pressures in excess of 100 pounds are not necessary although it is contemplated that high pressures of 500–5000 pounds may be used.

The invention will be further described in connection with the accompanying drawing which shows diagrammatically one form of apparatus for carrying out the process of the invention.

Referring to the drawing, a paraffin charging stock, mainly of straight chain composition, is introduced through the line 1 and pump 2 while paraffin charging stock, mainly of branch chain composition, is introduced through the line 3 and pump 4. By suitable regulation of the pumps 2 and 4 and the valves 6 and 8 respectively, suitable proportions of the charging stocks may be introduced. These charging stocks are commingled and passed through the line 10 to heating coil 11 located in a furnace 12. In the heating coil, the mixture is heated to the desired reaction temperature and then passed through the line 14 into the catalyst chamber 15. The tower 15 contains a catalyst suitably disposed therein to form adequate contact with the hydrocarbons. In case the catalyst is a solid material it may be disposed on a tray or trays. If the catalyst is a fluid or semifluid, other well known means may be used, such as countercurrent or concurrent flow. While one catalyst chamber is shown, it is to be understood that any number may be used alone or in connection with suitable separators for separating and recycling the catalyst. The reaction products from the catalyst tower 15 are transferred through the line 18 to a fractionator 20 wherein the higher boiling liquids are condensed and fractionated out. This heavier fraction may comprise naphtha, gas oil, lubricating oil, etc., depending on the type of reaction taking place and the nature of the charging stocks, and is withdrawn from the bottom of the tower 20 through the valve controlled line 21. The uncondensed vapors are passed through the vapor line 24 to fractionator 25 wherein additional vapors are condensed and the condensate fractionated out. Ordinarily the condensate separated in the tower 25 may be a motor fuel, which is withdrawn from the bottom thereof through the valve controlled line 26. The remaining uncondensed gases and vapors are passed through the line 28 to fractionator 30. In this tower, a separation is made between products that are desired to be recycled and those desired to be discarded. When the charging stocks are normally gaseous hydrocarbons, the recycle material withdrawn from the bottom of the tower 30 ordinarily predominates in $C_3$ and $C_4$ hydrocarbons. The latter are withdrawn from the bottom of fractionator 30 through line 32 and forced by the pump 33 through line 35 to the entrance of the heating coil 11.

In practicing the invention, it is desirable to maintain the composition of the reactive materials such that the concentration of branch chain paraffins is equal to or greater than the proportion of olefins. Ordinarily a conversion into olefins of around 10–25% per pass is obtained and accordingly at least this amount of branch chain paraffins should be maintained in the furnace charge.

As an example of the operation of the invention, a mixture of butane and isobutane was heated to about 750° F. and contacted with a catalyst composed of about equal proportions of chromic oxide gel and aluminum chloride. The reaction products were fractionated to obtain a gasoline product while the uncondensed gases were separated to obtain a fraction predominating in $C_3$ and $C_4$ hydrocarbons which were recycled to the heating coil. A conversion per pass, into olefins of around 15% was obtained and about 15–25% isobutane was maintained in the furnace charge. A motor fuel product of 80 octane or more, containing a high proportion of iso-octane was produced. An ultimate yield of around 60–75% based on original charging stock was obtained.

The invention, of course, is not limited to the above example and I may use other charging stocks, such as normally liquid paraffinic materials or a mixture of normally liquid and normally gaseous materials. For example, I may use straight gasoline hydrocarbons or a mixture of hydrocarbons within the gasoline boiling range and isobutane, or isopentane. When using the higher boiling point charging stocks, it is possible to obtain products suitable for the manufacture of lubricating oils.

Obviously many modifications and variations of the invention, as hereinbefore set forth, may be made without departing from the spirit and scope thereof and therefore only such limitations should be imposed as are indicated in the appended claims.

I claim:

1. A process for the conversion of low molecular weight paraffin and isoparaffin hydrocarbons into gasoline hydrocarbons, which comprises subjecting the hydrocarbons containing a greater number of carbon atoms than one to temperatures of about 450–1100° F. in the presence of chromic oxide and a metallic halide.

2. A process for the conversion of normally gaseous hydrocarbons into normally liquid hydrocarbons, which comprises subjecting gaseous hydrocarbons containing paraffins and isoparaffins having a greater number of carbon atoms per molecule than one, to temperatures of about 450–1100° F. in the presence of chromic oxide and a metallic halide.

3. A process for the conversion of lower molecular weight hydrocarbons into higher molecular weight gasoline hydrocarbons, which comprises subjecting low boiling paraffinic hydrocarbons containing a substantial amount of isobutane to temperatures of about 450–1100° F. in the presence of chromic oxide gel and a metallic halide.

4. A process for the conversion of lower molecular weight hydrocarbons into higher molecular weight gasoline hydrocarbons, which comprises subjecting low boiling normally liquid paraffinic hydrocarbons and isobutane to temperatures of about 450–1100° F. in the presence of chromic oxide gel and a metallic halide.

5. A process for the conversion of normally gaseous hydrocarbons into normally liquid hydrocarbons, which comprises subjecting gaseous paraffinic hydrocarbons having a greater number of carbon atoms per molecule than one and containing a substantial amount of isobutane to temperatures of about 450–1100° F. in the presence of chromic oxide gel and a metallic chloride.

6. A process for alkylating paraffin hydrocarbons to form gasoline hydrocarbons, which comprises subjecting a low boiling straight chain paraffin and a low boiling branch chain paraffin to temperatures of about 450–1100° F. in the presence of chromic oxide gel and a metallic halide.

7. A process for the manufacture of gasoline hydrocarbons, which comprises subjecting gaseous normal paraffin hydrocarbons of greater number of carbon atoms per molecule than one and low boiling isoparaffins to temperatures of 450–1100° F. in the presence of chromic oxide gel and a metallic halide.

8. A process for the conversion of normally gaseous hydrocarbons into liquid motor fuel, which comprises subjecting gaseous hydrocarbons predominating in paraffin hydrocarbons of 3 and 4 carbon atoms per molecule and containing a substantial amount of isobutane to temperatures of about 450–1100° F. in the presence of chromic oxide gel and an aluminum halide.

9. A process for the conversion of normally gaseous hydrocarbons into normally liquid hydrocarbons, which comprises subjecting butane and isobutane to temperatures of about 450–1100° F. in the presence of chromic oxide gel and aluminum chloride.

10. A process for the conversion of hydrocarbons, which comprises subjecting straight chain and branched chain paraffinic hydrocarbons to the action of chromic oxide and a metallic halide at temperatures sufficiently high to effect a substantial amount of dehydrogenation and alkylation to produce antiknock hydrocarbons within the motor fuel boiling point range.

11. A process according to claim 10 in which the temperature is about 600° to 1050° F.

12. A process according to claim 10 in which the proportions of the chromic oxide and metallic halide in the catalyst range between 20 to 80% and 80 to 20% respectively.

13. A process according to claim 10 in which the chromic oxide and metallic halide are supported on activated alumina.

ARTHUR R. GOLDSBY.